United States Patent [19]
Numbers

[11] Patent Number: 5,755,404
[45] Date of Patent: May 26, 1998

[54] FORCED AIR AIRCRAFT DE-ICER SYSTEM

[75] Inventor: Keith E. Numbers, Centerville, Ohio

[73] Assignee: The United States of America as represented by the Secretary of the Air Force, Washington, D.C.

[21] Appl. No.: 729,634

[22] Filed: Sep. 30, 1996

[51] Int. Cl.$^6$ .................. B64D 15/04; B05B 1/00
[52] U.S. Cl. .................. 244/134 C; 244/134 R; 239/589
[58] Field of Search .................. 244/134 R, 134 C, 244/114 R; 239/589

[56] References Cited

U.S. PATENT DOCUMENTS

| | | | |
|---|---|---|---|
| 2,422,746 | 6/1947 | Patterson | 244/134 C |
| 4,161,280 | 7/1979 | Kasinskas | 239/589 X |
| 4,813,611 | 3/1989 | Fontana | 239/589 |
| 5,134,266 | 7/1992 | Peppard | 244/134 R X |
| 5,244,168 | 9/1993 | Williams | 244/134 C |

FOREIGN PATENT DOCUMENTS 2177939  2/1987  United Kingdom .................. 239/589

*Primary Examiner*—William Grant
*Attorney, Agent, or Firm*—Bobby D. Scearce; Thomas L. Kundert

[57] ABSTRACT

A system for the forced air de-icing of aircraft is described which includes a source of pressurized air and an axisymmetric, high momentum focused air jet nozzle having an inlet of diameter D and an outlet of diameter d with an axisymmetric contour therebetween defined by a converging portion of first radius near the inlet and a reflex portion of second radius near the outlet, the converging and reflex portions being connected by a convergent conical portion tangent to both the converging and reflex portions and having an angle of convergence equal to or less than 30°, wherein D is equal to or greater than 2d, the first radius is equal to or greater than D, the second radius is equal to or greater than d, and the length of the nozzle is equal to or greater than 1.5 D, and an insulated conduit for conducting pressurized air from the source to the nozzle.

11 Claims, 2 Drawing Sheets

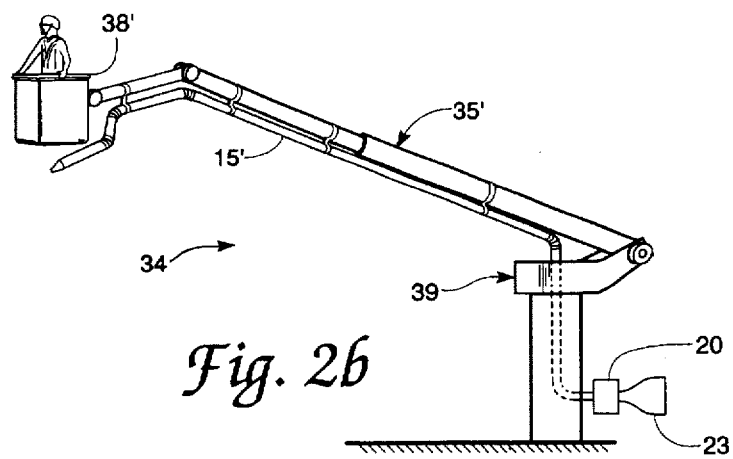
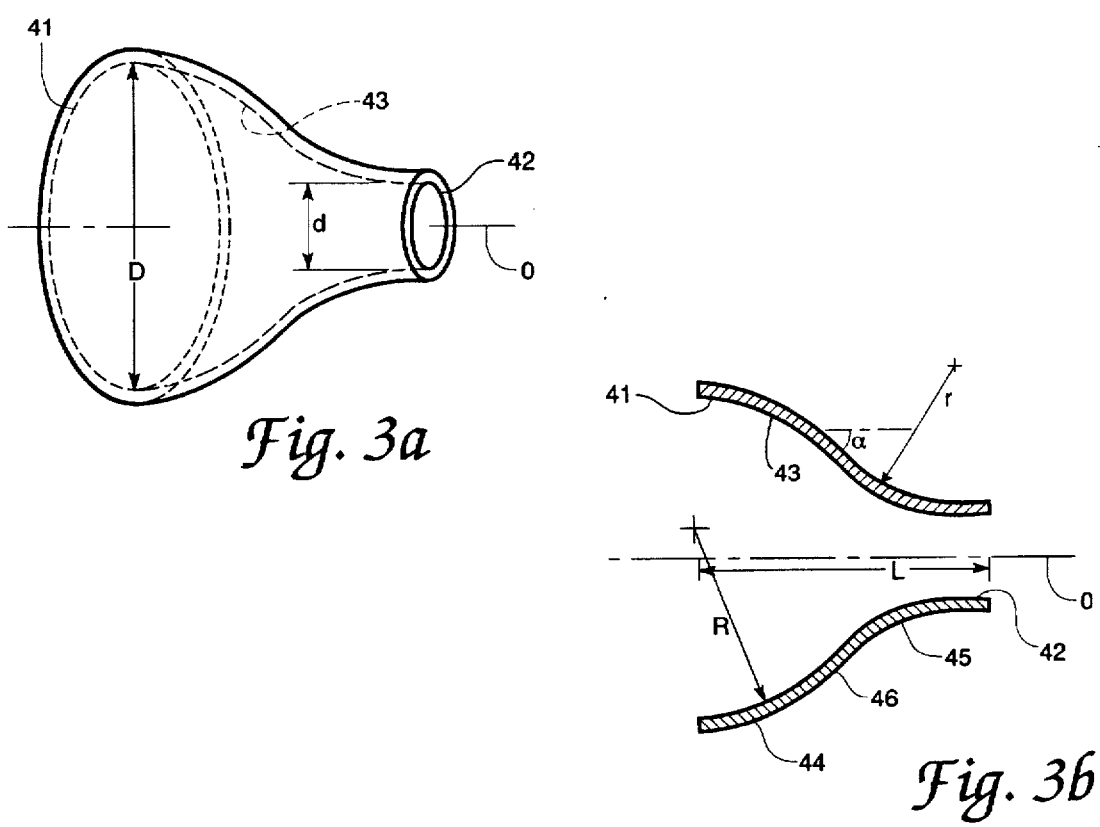

FORCED AIR AIRCRAFT DE-ICER SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and methods for de-icing aircraft, and more particularly to a system for the forced air de-icing of aircraft.

Prior art de-icing systems and methods have typically consisted of spraying large quantities of de-icing fluids onto snow and ice-covered aircraft surfaces. Though effective, prior art methods normally use environmentally hazardous fluids and therefore require expensive associated systems for fluid storage, usage, collection, recycling, and disposal. Certain prior systems utilize a high-speed air jet blast (alone or in combination with various de-icing fluids) to mechanically dislodge snow and ice, rather than melting it with fluids by chemical or thermal means, and exhibit the advantage of greatly reducing the amounts of fluids required.

U.S. Pat. No. 2,422,746 to Patterson describes a high-pressure air and liquid jet positioned at the forward portion of an airplane wing, so that the jet and the fluid ejected underlie any film of ice that forms on the wing edges and surfaces, tear off accumulations of ice and snow on the forward edges of the wing, and allow the air stream over the wing to tear off the remaining ice accumulated on the rear and upper surfaces of the wing. This system is inappropriate for de-icing aircraft prior to takeoff, and adds to the expense, complexity, weight, and fuel usage in modern aircraft.

U.S. Pat. No. 5,244,168 to Williams describes forced air de-icing using air entrained de-icing fluid (Type I and Type II), a source of compressed air and a mixing nozzle coupled to the sources of fluid and compressed air which produces the jet air blast, with various fluid spray patterns. The primary parameter for the air jet blast effectiveness is described as momentum per unit mass (air jet velocity). The Williams method consists of sweeping the aircraft with the air jet blast alone to remove as much snow and ice as possible, then using the entrained fluid to complete the removal process. Specifically, Williams uses a conventional turbine auxiliary power unit (APU) as the source of compressed air, capable of heated (about 400° F.) or unheated output, with controlled temperature, pressure and flow rate. An air conduit of unspecified design delivers compressed air to a mixing nozzle depicted in the figures as a straight-sided converging (conical) configuration. The air conduit is configured to enhance heat transfer to an adjacent fluid conduit as a means of heating the fluid. Compressed air is delivered to the mixing nozzle at flow rates of 50–200 mph. Working distance to the aircraft is stated to be up to ten feet. An air jet blast of 100–200 mph is described as sufficient to mechanically dislodge snow and ice off a wing previously prepared with Type II anti-icing fluid, which is consistent with the operational characteristics of Type II fluid having ice shearing capabilities at aircraft take-off speeds in the same range. A prototype mobile vehicle constructed by Williams includes a Trump de-icing truck with a Garrett APU installed in the rear. High pressure hose of the type used for aircraft engine air starter systems is used in the air conduit along with aluminum pipe of three-inch diameter. The prototype aluminum nozzle is flared with a narrow slot opening, similar to those used commonly on hand-held leaf blowers. The entire teachings of the Williams patent are incorporated by reference herein.

In an unpatented reference, Landoll Corporation supplies for its Model TM-1800 Deicer/Washer truck a modification kit including a bracket for mounting a standard MA-1A turbine APU to the rotating boom of the truck using a trombone air tube assembly on the boom via a braided high-pressure hose and aluminum 90° elbow fixtures, and a generally conically shaped nozzle. This system uses a jet air blast for mechanically dislodging snow and ice.

The prior art systems suffer from one or more disadvantages, including: a high life cycle cost associated with acquisition, operation and maintenance of a turbine APU; inefficient air intake on the APU and air conduit having abrupt area changes and short radius elbows which promote excessive pressure loss in the flowpath and substantially decreases efficiency of the compressed air source; uninsulated or poorly insulated conduit resulting in loss of thermal energy which could be converted to increased air jet momentum and de-icing effectiveness and which also increases the risk of burns to system operators; a conical or flared metallic nozzle which can potentially damage the aircraft surface and which cannot maintain adequate air jet momentum at a point of application ten feet from the nozzle; and use of heated APU output which does not substantially contribute to the desired mechanical dislodging of ice but may result in ice melt which may flow into aircraft control mechanisms and refreeze, possibly causing aircraft control failure.

The invention solves or substantially reduces in critical importance problems with prior art de-icing systems as just suggested by providing a forced air de-icing system having a compressed air source including a positive displacement blower (lobed, vaned or piston) driven by a rotary power source (internal combustion engine, hydraulic or electric motor), the combination being inexpensive, low maintenance and appropriately sized for a forced air de-icing system, compared to a turbine APU; a large diameter insulated air delivery conduit of smooth flowpath construction for minimizing thermal energy and pressure loss, enabling use of an inexpensive blower and rotary power source; a novel focused, high momentum air jet nozzle structure effective at a point of application up to ten feet distant; and a relatively cool air jet blast at the point of application to prevent ice melting and refreeze.

It is a principal object of the invention to provide an improved aircraft de-icing system.

It is a further object of the invention to provide an aircraft de-icing system using forced air.

It is yet another object of the invention to provide an improved nozzle structure for use in an aircraft de-icing system using forced air.

These and other objects of the invention will become apparent as the detailed description of representative embodiments proceeds.

SUMMARY OF THE INVENTION

In accordance with the foregoing principles and objects of the invention, a system for the forced air de-icing of aircraft is described which includes a source of pressurized air and an axisymmetric, high momentum focused air jet nozzle having an inlet of diameter D and an outlet of diameter d with an axisymmetric contour therebetween defined by a converging portion of first radius near the inlet and a reflex portion of second radius near the outlet, the converging and reflex portions being connected by a convergent conical portion tangent to both the converging and reflex portions and having an angle of convergence equal to or less than 30°, wherein D is equal to or greater than 2d, the first radius is equal to or greater than D, the second radius is equal to or greater than d, and the length of the nozzle is equal to or greater than 1.5 D, and an insulated conduit for conducting pressurized air from the source to the nozzle.

BRIEF DESCRIPTION OF THE DRAWINGS

The invention will be more clearly understood from the following detailed description of representative embodiments thereof read in conjunction with the accompanying drawings wherein:

FIGS. 2a and 2b show installations of the invention as a mobile unit and a fixed ground unit, respectively; and FIGS. 3a and 3b show the structural details in perspective and in axial section of a high momentum focused air jet nozzle of the invention.

DETAILED DESCRIPTION

Figure 1:
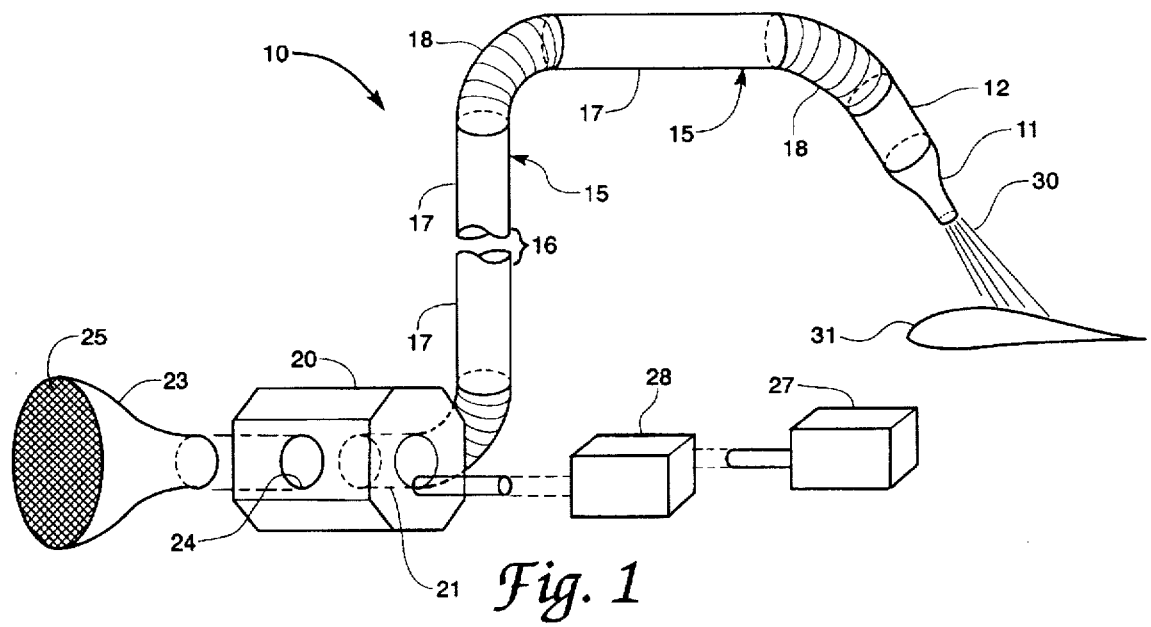
FIG. 1 is a schematic perspective view of a pressurized air delivery system including the essential component parts of the invention.

Referring now to the drawings, FIG. 1 shows a schematic perspective view of a pressurized air delivery system 10 including the essential component parts of the invention. High momentum focused air jet nozzle 11 comprising a central feature of the invention is attached to a rigid steering pipe segment 12. Pipe segment 12 provides means and location for attaching a mechanical aiming device (not shown) for directing a forced air stream through nozzle 11 onto an aircraft surface in accordance with the principal purpose of the invention. Air conduit 15 comprises two or more substantially rigid conduit segments 17 connected by flexible conduit segment(s) 18. The various segments 17,18 may be joined using any suitable connecting means, such as clamps, screwed fittings, flanges or the like, so long as a smooth internal flow path within conduit 15 is maintained. Conduit 15 may preferably be of sufficiently rigid construction to prevent short radius bends or kinking along the length thereof during operation of system 10, and otherwise has a smooth inner surface, in order to maintain a smooth internal airflow path. In a system built in demonstration of the invention, conduit 15 was about four inches inner diameter and 30 feet in length (4–5 segments 17), segments 17 comprising silicone/fabric composite (Flexfab, Inc., Flint Mich.), flexible segments 18 having flexible wire reinforcement; other suitable conventional materials of construction for the intended purpose may be selected by one skilled in the art guided by these teachings, specific material choice not considered limiting of the invention. Conduit 15 may be covered by insulating layer 16 (up to about one inch in thickness) of fiber glass, closed cell foam, mineral wool or other suitable insulator in order to minimize airflow energy losses within conduit 15 and to avoid burn hazards to an operator of system 10. Air conduit 15 is connected at one end to pipe segment 12 and nozzle 11 and at the other end to positive displacement blower 20 at blower output port 21. Blower intake bellmouth 23 of preselected (preferably lemniscate) shape is attached to blower 20 at blower intake port 24. Intake screen 25 may be attached to intake bellmouth 23 as suggested in FIG. 1. Blower 20 may be operatively connected to rotary power source 27 through conventional transmission means 28. In the operation of system 10, a high velocity airjet 30 is discharged from nozzle 11 and is directed toward a snow and ice covered stationary aircraft surface 31 as described more fully below. In the demonstration system, blower 20 (such as a Garrett APU (Garrett Corp, Phoenix Ariz.) or rotary lobed type Roots-Dresser (model 616, Connersville Ind.) blower) provided high pressure airflow sufficient for de-icing in accordance with a purpose of the invention.

Figure 2A:
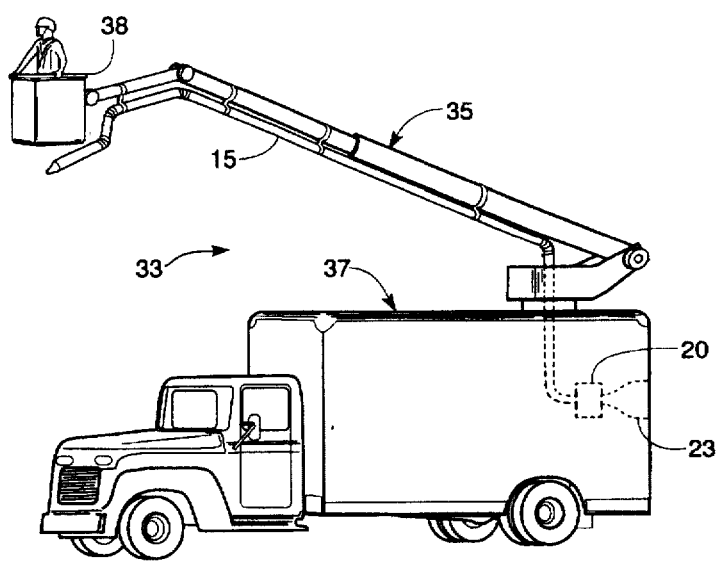

FIGS. 2a and 2b show respective representative installations of system 10 of the invention as a mobile unit 33 and a fixed ground unit 34. In FIG. 2a, air conduit 15 is attached to articulating boom 35 of conventional structure and operation mounted on a vehicle 37 and controllable by an operator from within bucket 38 on boom 35 as suggested in the figures. In FIG. 2b, air conduit 15' may be attached to articulating boom 35' mounted on a stationary support 39 controllable by an operator from within bucket 38' on boom 35'. The flexible conduit sections of conduits 15 or 15' may be sized and placed by one of skill in the art guided by these teachings, according to the physical dimensions and movement capabilities of articulating booms 35,35'.

FIGS. 3a and 3b show structural details respectively in perspective and in axial section of a high momentum focused air jet nozzle 11 comprising a central feature of the invention. Nozzle 11 is symmetric about longitudinal axis O, has inlet opening 41 of inner diameter D for connection to conduit 15 (FIG. 1) and narrows to outlet opening 42 of inner diameter d along preselected contour 43 over preselected length L. Outlet opening 42 is sized in inner diameter (typically about 1.5 to 2.75 inches, preferably about two inches) at which sonic air flow conditions are produced for the imposed air flow rate through conduit 15 (viz., D>2d). Nozzle contour 43 defines the converging shape of high momentum focused air jet nozzle, in order to produce maximum attainable airflow momentum (velocity) at the discharge opening for the given high pressure air source capacity of positive displacement blower 20, and minimizes velocity loss and dispersion of unconstrained air jet 30 at discharge. Air jet 30 is therefore focused with high momentum at a point of application, which increases the air jet blast effectiveness. Contour 43 consists of two circular arcs 44,45 of respective radii R,r (FIG. 3b) connected by substantially straight (i.e., conically shaped) convergent section 46. Convergent radius R is sized at R>D and reflex radius r is sized at r>d. Convergent section 46 is defined at an angle $\alpha<30°$ to axis O and is tangent to both arcs 44,45. Length L of nozzle 11 is at least 1.5 times D. In the demonstration unit, d was about two inches, D about four inches, and L about six inches. In the preferred contour 43, R was about eight inches, $\alpha$ about 17°, and r about 10 inches. Nozzle 11 may be comprise any suitable conventional structural material with wall thickness sufficient to prevent deformation of contour 43 during normal operation. In the demonstration system, nozzle 11 was constructed entirely of fabric-reinforced silicone material (Flexfab). In order to attain an air jet 30 flow rate of about 1300 scfm, d is about two inches and L is about six inches; for 650 scfm, d is about 1.5 inches, L three inches; for 2600 scfm, d is about 2.75 inches, L is nine inches. Blower 20 must produce about 15 to 18 psig.

In the operation of a preferred embodiment of the invention, rotary power source 27 (a hydraulic motor) and transmission 28 provide power to blower 20. Blower 20 normally provides pressurized airflow through conduit 15 to inlet opening 41 of nozzle 11 at about two atmospheres; pressure and a temperature of about 200° F. Air pressure loss along conduit 15 may be kept to less than about 5% in system 10 structured as just described. Nozzle 11 accelerates the airflow to sonic velocity at outlet 42. At this point, the air pressure is reduced back to atmospheric, and air jet 30 is produced with a velocity of about 760 mph and a flow rate of about 1300 scfm, which velocity is an improvement of about 10% over uninsulated construction. Temperature associated with the reduced pressure at this point is about 60° F. Air jet 30 loses momentum (and temperatrue) with distance from nozzle 11 so that at about five feet, the velocity is about 200 mph (and 30° F.), and at ten feet, about 100 mph (and 25° F.), which velocities compare favorably with those associated with prior art nozzles which are typically 120 mph at five feet and less than 100 mph at ten feet. Air jet 30 is directed onto snow and ice covered stationary aircraft surface 31 by selectively positioning steering pipe 12 via control means (not shown).

The invention therefore provides an aircraft de-icing system using forced air including a novel nozzle structure for producing sonic airflow from the system. The invention may be used both for snow and ice removal from stationary aircraft surfaces and for removal of snow, sand, dust or other materials from substantially any equipment surface. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A system for de-icing the surface of an aircraft using forced air, comprising:

(a) a source of pressurized air;

(b) a high momentum focused air jet nozzle having first and second ends, said nozzle being axisymmetric from said first end to said second end, and means defining an inlet of diameter D at said first end and an outlet of diameter d at said second end, said nozzle having an axisymmetric contour comprising a converging portion near said inlet, said converging portion having a first radius, and a reflex portion near said outlet, said reflex portion having a second radius, said converging portion and said reflex portion being connected by a convergent conical portion tangent to both said converging portion and said reflex portion and having an angle of convergence equal to or less than 30° relative to the axis of said nozzle, wherein D is equal to or greater than 2d, said first radius is equal to or greater than D, said second radius is equal to or greater than d, and the length of said nozzle from said first end to said second end is equal to or greater than 1.5 D; and (c) conduit means for conducting said pressurized air from said source to said nozzle.

2. The system of claim 1 wherein d is about 1.5 to 2.75 inches.

3. The system of claim 1 wherein said angle of convergence is about 17°.

4. The system of claim 1 wherein said first radius is about eight inches and said second radius is about ten inches.

5. The system of claim 1 wherein said nozzle comprises fiber reinforced silicone material.

6. The system of claim 1 wherein said conduit means includes a insulating layer.

7. A high momentum focused air jet nozzle for use in a forced air de-icing system for aircraft, comprising, a generally tubular structure having first and second ends, said structure being axisymmetric from said first end to said second end, and means defining an inlet of diameter D at said first end and an outlet of diameter d at said second end, said structure having an axisymmetric contour comprising a converging portion near said inlet, said converging portion having a first radius, and a reflex portion near said outlet, said reflex portion having a second radius, said converging portion and said reflex portion being connected by a convergent conical portion tangent to both said converging portion and said reflex portion and having an angle of convergence equal to or less than 30° relative to the axis of said structure, wherein D is equal to or greater than 2d, said first radius is equal to or greater than D, said second radius is equal to or greater than d, and the length of said structure from said first end to said second end is equal to or greater than 1.5 D.

8. The nozzle of claim 7 wherein d is about 1.5 to 2.75 inches.

9. The nozzle of claim 7 wherein said angle of convergence is about 17°.

10. The nozzle of claim 7 wherein said first radius is about eight inches and said second radius is about ten inches.

11. The nozzle of claim 7 wherein said structure comprises fabric-reinforced silicone material.

* * * * *